United States Patent
Chen et al.

(10) Patent No.: US 7,515,912 B2
(45) Date of Patent: Apr. 7, 2009

(54) METHOD FOR DEPLOYMENT SCHEDULING FOR MOBILE COMMUNICATION NETWORK

(75) Inventors: Meng-Seng Chen, Taipei (TW);
Yuan-Pai Chen, Taipei (TW);
Chun-Chih Yeh, Taipei (TW)

(73) Assignee: Groundhog Technologies Inc., Cambridge ( * ) Notice: Subject to any disclaimer, the term of this patent is extended or adjusted under 35 U.S.C. 154(b) by 527 days.

(21) Appl. No.: 11/252,552

(22) Filed: Oct. 19, 2005

(65) Prior Publication Data

US 2007/0087755 A1    Apr. 19, 2007

(51) Int. Cl.
*H04Q 7/20* (2006.01)
(52) U.S. Cl. .................... 455/447; 455/446; 455/435.2; 455/456.1
(58) Field of Classification Search ................. 455/423, 455/414.1–414.2, 67.7, 446, 435.2, 453, 455/447, 456.1, 464, 452.1, 432.3, 560, 456.3; 370/229, 236.1
See application file for complete search history.

(56) References Cited

U.S. PATENT DOCUMENTS 6,311,067 B1 * 10/2001 Sammour et al. .......... 455/446
2002/0123338 A1 * 9/2002 Iyer ........................... 455/423
2005/0097161 A1 * 5/2005 Chiou et al. ................. 709/200
2006/0045093 A1 * 3/2006 Choi ........................ 370/395.4

FOREIGN PATENT DOCUMENTS

GB          2 357 396       6/2001
WO     WO 2005/018259      2/2005

* cited by examiner

*Primary Examiner*—John J Lee

(57) ABSTRACT

A method for deployment scheduling for a mobile communication network is disclosed. The mobile network is to be changed from a first network plan to a second network plan, and both the first and second network plans include a plurality of BSC (base station controller) areas and location areas. The method includes: (a) selecting a BSC area from a current network plan; (b) performing a site movement from each source neighboring BSC area to the selected BSC area if the selected BSC area is empty; (c) performing a site movement from each source neighboring BSC area to the selected BSC area if the selected BSC area contains an unchangeable site, wherein each moved-in site becomes an unchangeable site neighboring to another unchangeable site of the selected BSC area; and (d) performing a site movement from a source neighboring BSC area to the selected BSC area according to current configuration of first sites within the selected BSC area if the selected BSC area is non-empty and contains no unchangeable site, wherein the first sites are neighboring to a second site of the source neighboring BSC area targeted to the selected BSC area.

14 Claims, 15 Drawing Sheets

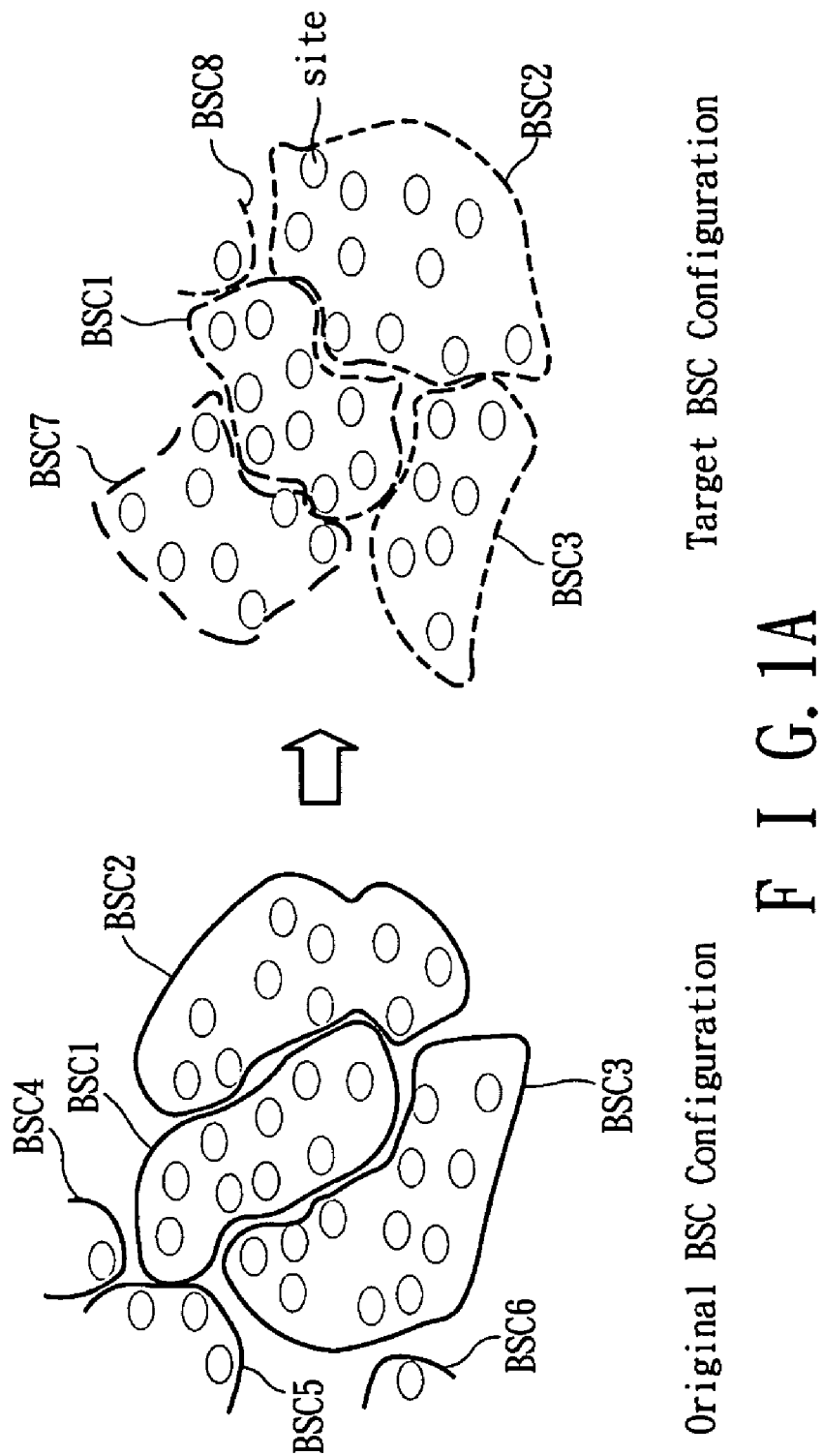
F I G. 1A

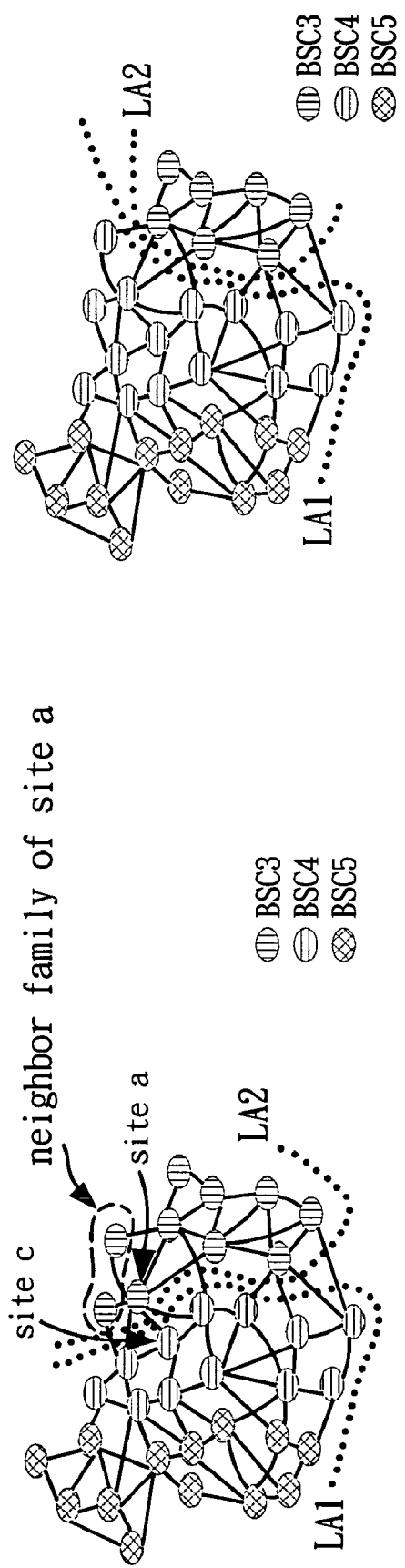
FIG. 3A — current network plan
FIG. 3B — After site movement to BSC3

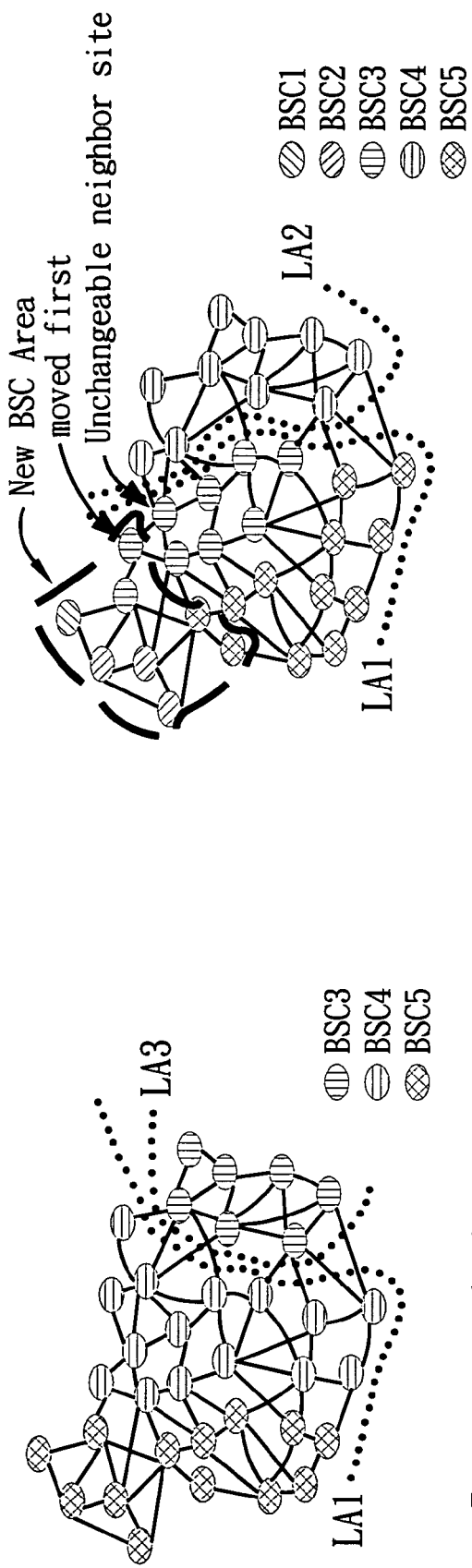

Target network plan

After site movement to BSC6

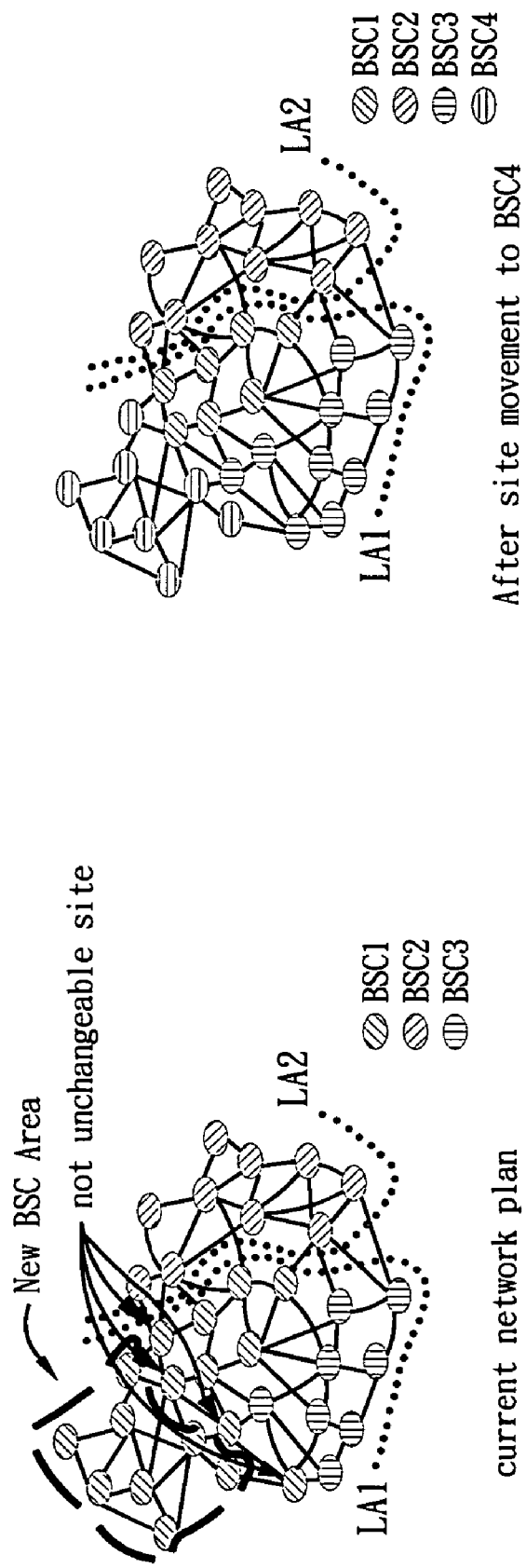
FIG. 5A — current network plan
FIG. 5B — After site movement to BSC4

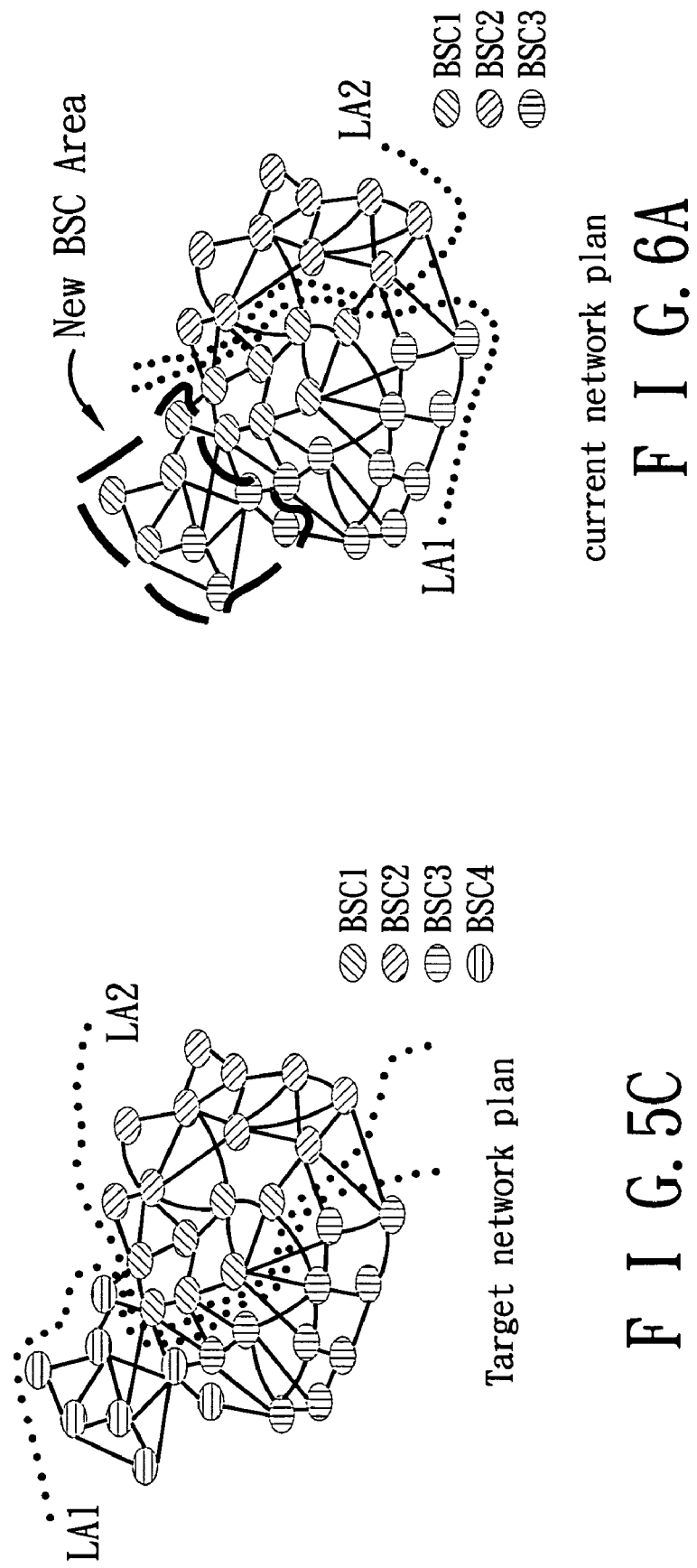
FIG. 6A current network plan
FIG. 5C Target network plan

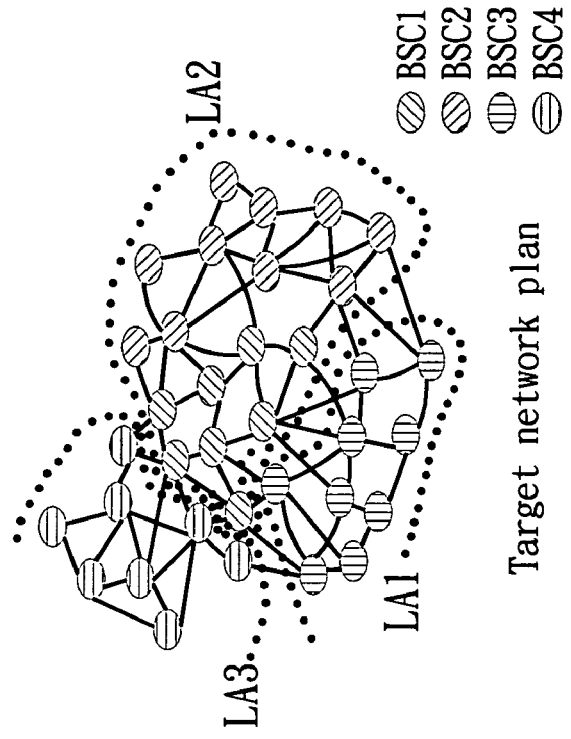
FIG. 6C  Target network plan
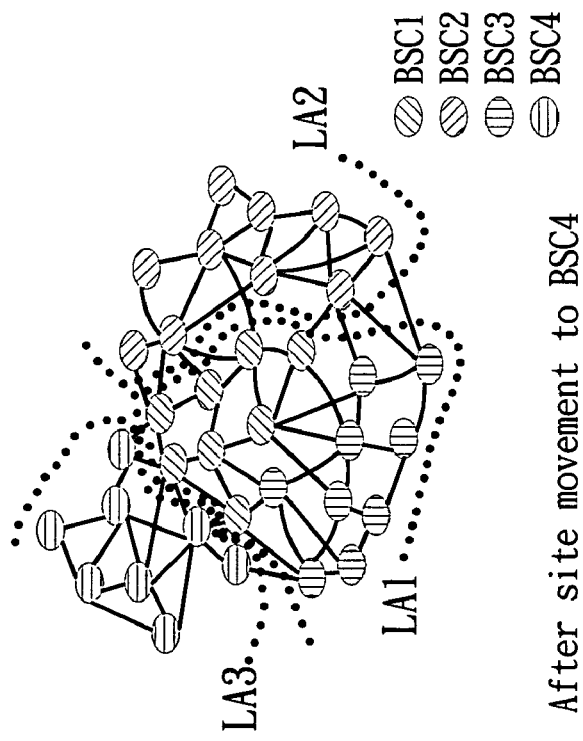
FIG. 6B  After site movement to BSC4

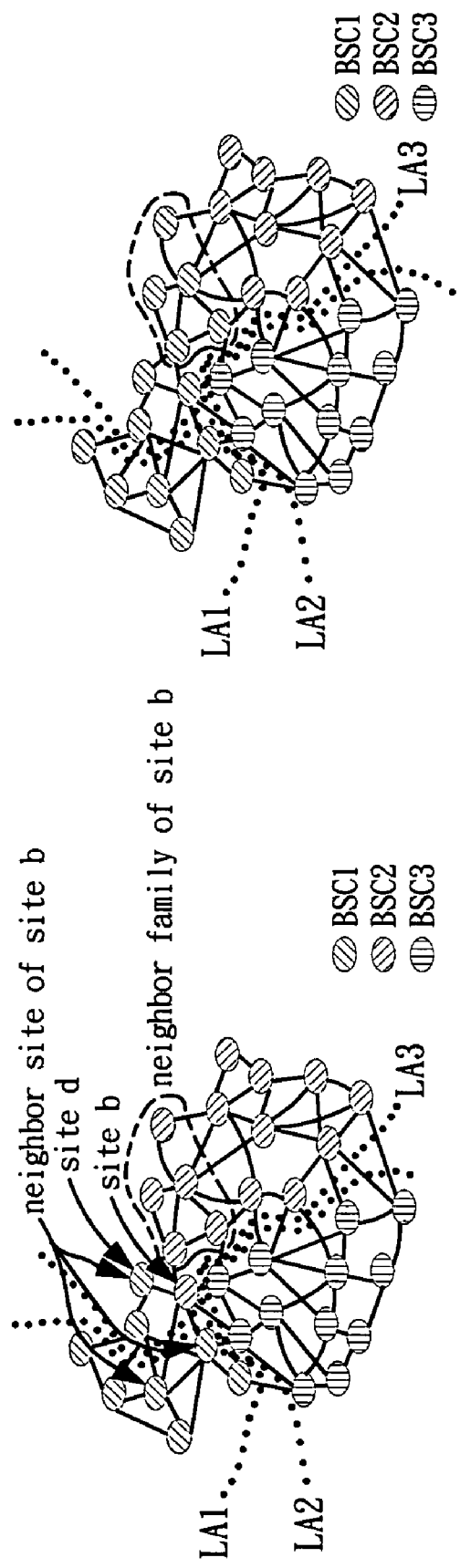
FIG. 8B  After site movement to BSC1
FIG. 8A  current network plan

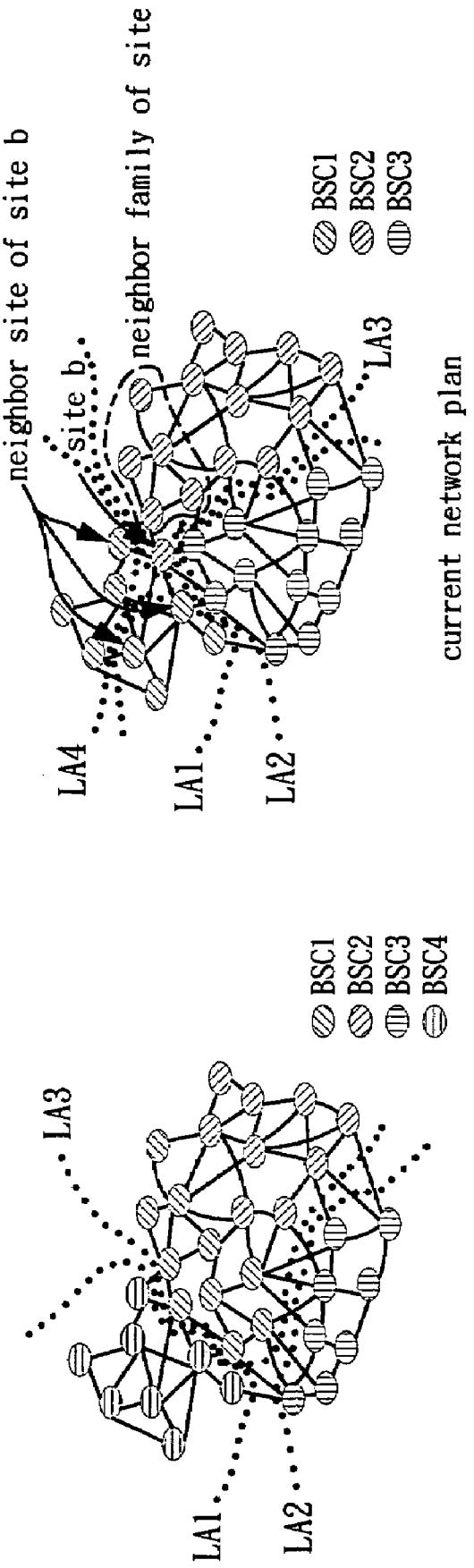

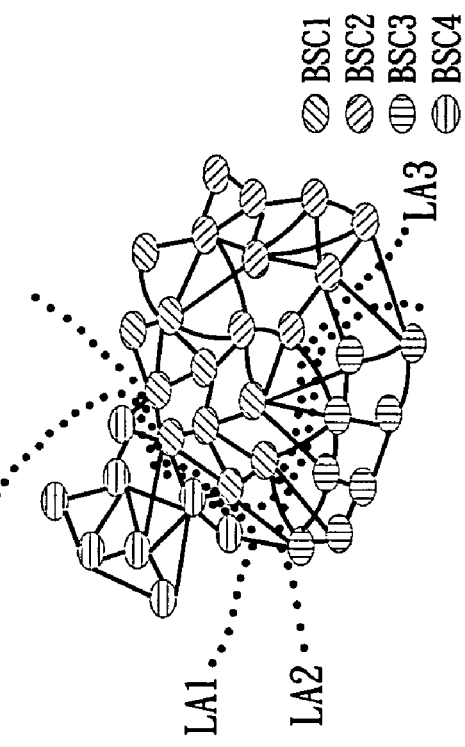
FIG. 9C  Target network plan
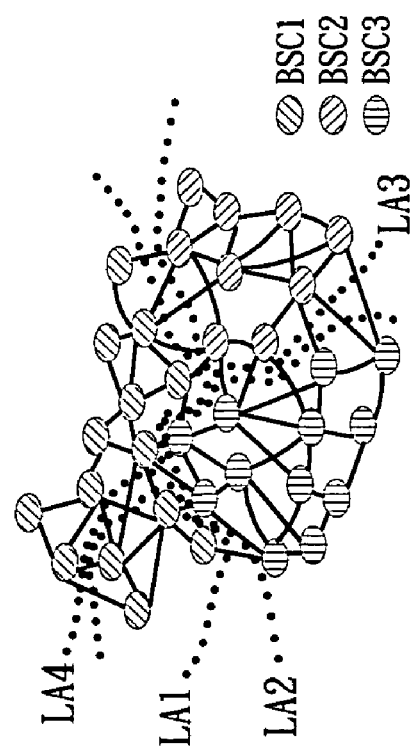
FIG. 9B  After site movement to BSC1

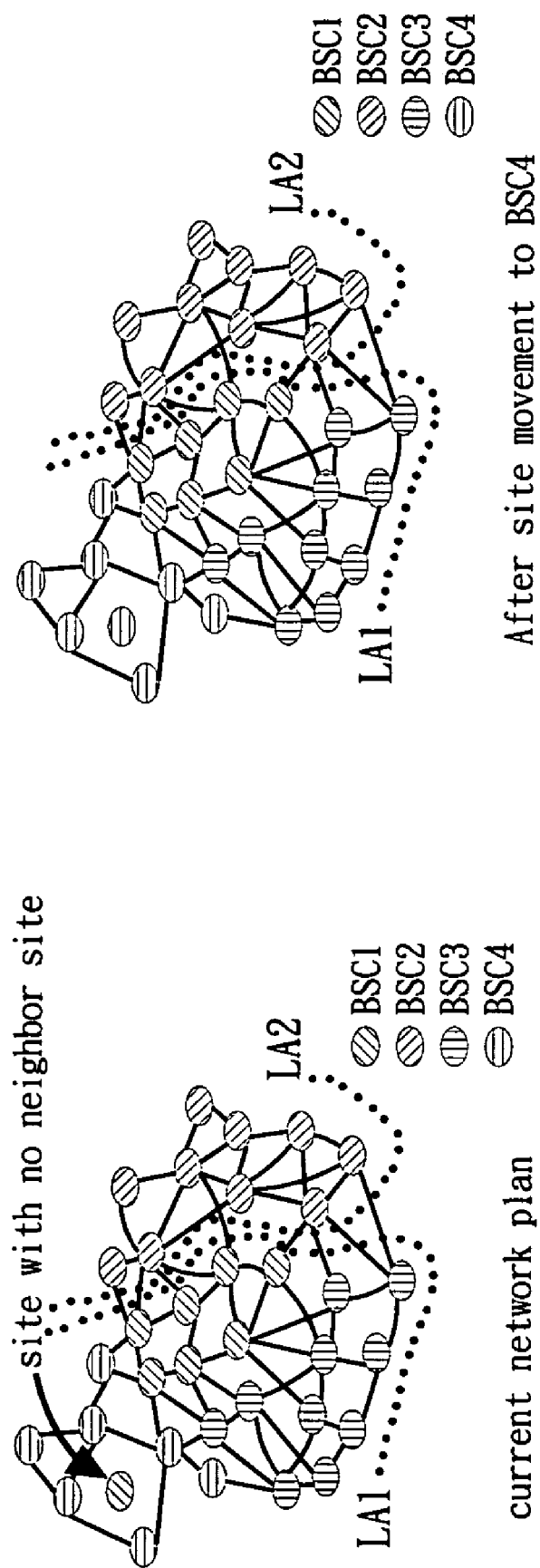
F I G. 10B  After site movement to BSC4
F I G. 10A  current network plan

METHOD FOR DEPLOYMENT SCHEDULING FOR MOBILE COMMUNICATION NETWORK

CROSS-REFERENCE TO RELATED APPLICATIONS

The present application claims the benefit of U.S. Provisional Application 60/617,033, filed on Oct. 12, 2004, which is herein incorporated by reference.

BACKGROUND OF INVENTION

1. Field of the Invention

The present invention relates to a mobile communication network, and more particularly, to a method for deployment scheduling for the mobile communication network.

2. Description of the Prior Art

Typically, a mobile communication network is partitioned into a plurality of partition areas to facilitate mobility management. The partition areas form a network plan. In some kinds of mobile networks, a multi-layer partitioning structure is applied. The multi-layer structure has a hierarchy of partition layers, where each partition layer is composed of one or more corresponding partition areas. For example, a GSM (i.e. Global System for Mobile communication) network may employ a multi-layer structure that includes the partition layers of BTS (i.e. base transceiver station) area, BSC (i.e. base station controller) area, location area, and MSC (i.e. mobile switching center) area, from down to top.

When a mobile network in operation needs to reconfigure its network plan, i.e. to change from an original network plan into a target one, it is necessary to keep the network in normal condition during the network reconfiguration. Thus, the reconfiguration should be deployed in a progressive manner, and the issue of deployment scheduling is introduced here. The deployment scheduling determines the sequence in which the mobile network changes toward the target network plan step by step. FIGS. 1A and 1B show an example of reconfiguration for a mobile network with the partition layers of BTS area, BSC area and location area (LA). FIG. 1A shows the original and target BSC configuration of the mobile network, while FIG. 1B shows the original and target LA configuration of the mobile network. As shown in FIGS. 1A and 1B, there are one or more BTSs (or sites) within each BSC area and location area.

However, the conventional technology does not provide a systematic and objective solution for network operators to proceed deployment scheduling. Thus, it depends on the subjective experience of the operators or the try-and-error way to handle this issue. Usually, this approach may cause area disconnectivity and network overloading during the deployment. The area disconnectivity means that a partition area is separated into two or more individual parts, and this would increase the load of the network and raise the risk of overloading. For example, the disconnectivity of a location area would increase the number of times of location updates. Besides, the overloading may occur due to an improper order of moving sites between the partition areas. For example, a heavy-loaded BSC area may be overloaded since moving sites thereto is performed before moving sites therefrom.

SUMMARY OF INVENTION

It is therefore an objective of the present invention to provide a method for deployment scheduling for a mobile communication network, thereby reducing the possibility of area disconnectivity and network overloading during the deployment.

Another objective of the present invention is to provide a method for changing a mobile communication network from a first network plan into a second network plan, thereby reducing the possibility of area disconnectivity and network overloading during the process of changing.

According to an embodiment of the present invention, a method for deployment scheduling for a mobile communication network is provided. The mobile communication network is to be changed from an original network plan to a target network plan, and both the original and target network plans includes a plurality of BSC areas and location areas. The method comprises following steps: (a) selecting a BSC area from a current network plan of the mobile communication network; (b) performing a site movement from each source neighboring BSC area of the selected BSC area to the selected BSC area if the selected BSC area is empty; (c) performing a site movement from each source neighboring BSC area of the selected BSC area to the selected BSC area if the selected BSC area contains at least one unchangeable site, wherein each moved-in site becomes an unchangeable site neighboring to another unchangeable site of the selected BSC area; and (d) performing a site movement from a source neighboring BSC area of the selected BSC area to the selected BSC area according to current configuration of first sites within the selected BSC area if the selected BSC area is non-empty and contains no unchangeable site, wherein the first sites are neighboring to a second site of the source neighboring BSC area targeted to the selected BSC area.

According to another embodiment of the present invention, a method for changing a mobile communication network from a first network plan into a second network plan is provided. Both the first and second network plans includes a plurality of BSC areas and location areas. The method comprises following steps: performing a site movement from a source neighboring BSC area of a first BSC area to the first BSC area, wherein the first BSC area contains at least one unchangeable site, and each moved-in site becomes an unchangeable site neighboring to another unchangeable site of the first BSC area; and performing a site movement from a source neighboring BSC area of a second BSC area to the second BSC area according to current configuration of first sites within the second BSC area, wherein the second BSC area does not contain any unchangeable site, and the first sites are neighboring to a second site of the source neighboring BSC area targeted to the second BSC area.

According to another embodiment of the present invention, a method for changing a mobile communication network from a first network plan into a second network plan is provided. Both the first and second network plans comprises a plurality of sites, first areas and second areas. Each of the sites belongs to one of the first areas and one of the second areas. Each site within the first area is linked to a controller of the corresponding first area. Each of the second areas is a logical area with a corresponding identifier. The method comprises performing a site movement from a source neighboring first area of a first area to the first area. If the first area contains at least one unchangeable site, each moved-in site becomes an unchangeable site neighboring to another unchangeable site of the first area; if the first area does not contain any unchangeable site, the site movement is performed according to current configuration of first sites within the first area, wherein the first sites are neighboring to a second site of the source neighboring first area targeted to the first area. Preferably, each of the first areas is a BSC (base station controller)

area, and each of the second areas and the corresponding identifier are a location area and a LAC (location area code) respectively.

BRIEF DESCRIPTION OF THE DRAWINGS

FIGS. 1A and 1B show an example of reconfiguration for a mobile network with the partition layers of BTS area, BSC area and location area (LA).

FIG. 3A to 3C are diagrams showing an example of performing a site movement while maintaining BSC area connectivity.

FIG. 4A to 4C are diagrams showing an example of performing step 22 for an empty BSC area having the first neighboring BSC area.

FIG. 5A to 5C are diagrams showing an example of performing step 22 for an empty BSC area without the first neighboring BSC area.

FIG. 6A to 6C are diagrams showing an example of performing step 22 for an empty BSC area with a new LAC as the target LAC.

FIG. 8A to 8C are diagrams showing an example of performing step 25 for case 1.

FIG. 9A to 9C are diagrams showing an example of performing step 25 for case 2.

FIGS. 10A and 10B are diagrams showing an example of performing step 27.

DETAILED DESCRIPTION

Though the embodiments described below may take a GSM network for example, people skilled in the art can easily apply technological features of the present invention to other mobile communication networks. Thus, the scope of the present invention is not limited to the GSM network.

Figure 1B:
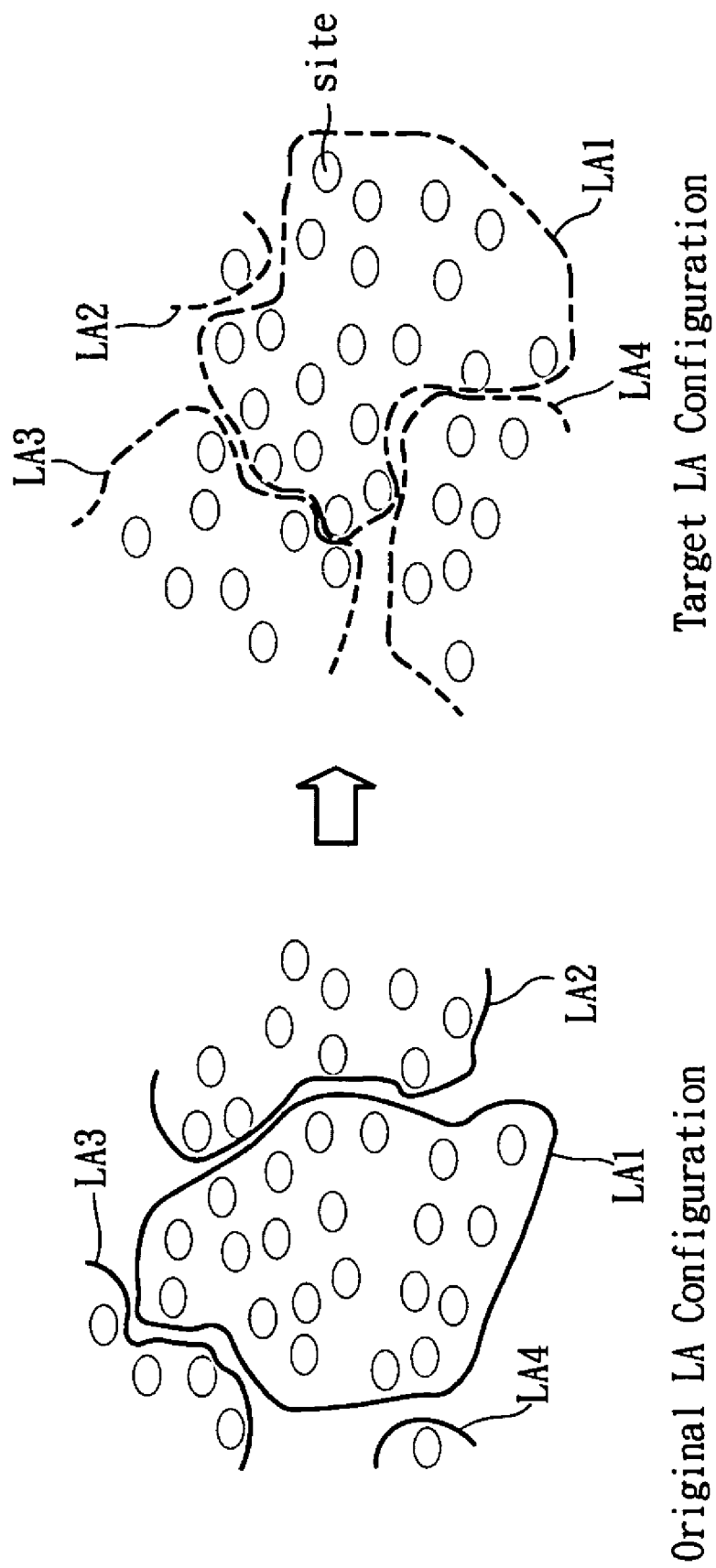
Figure 2:
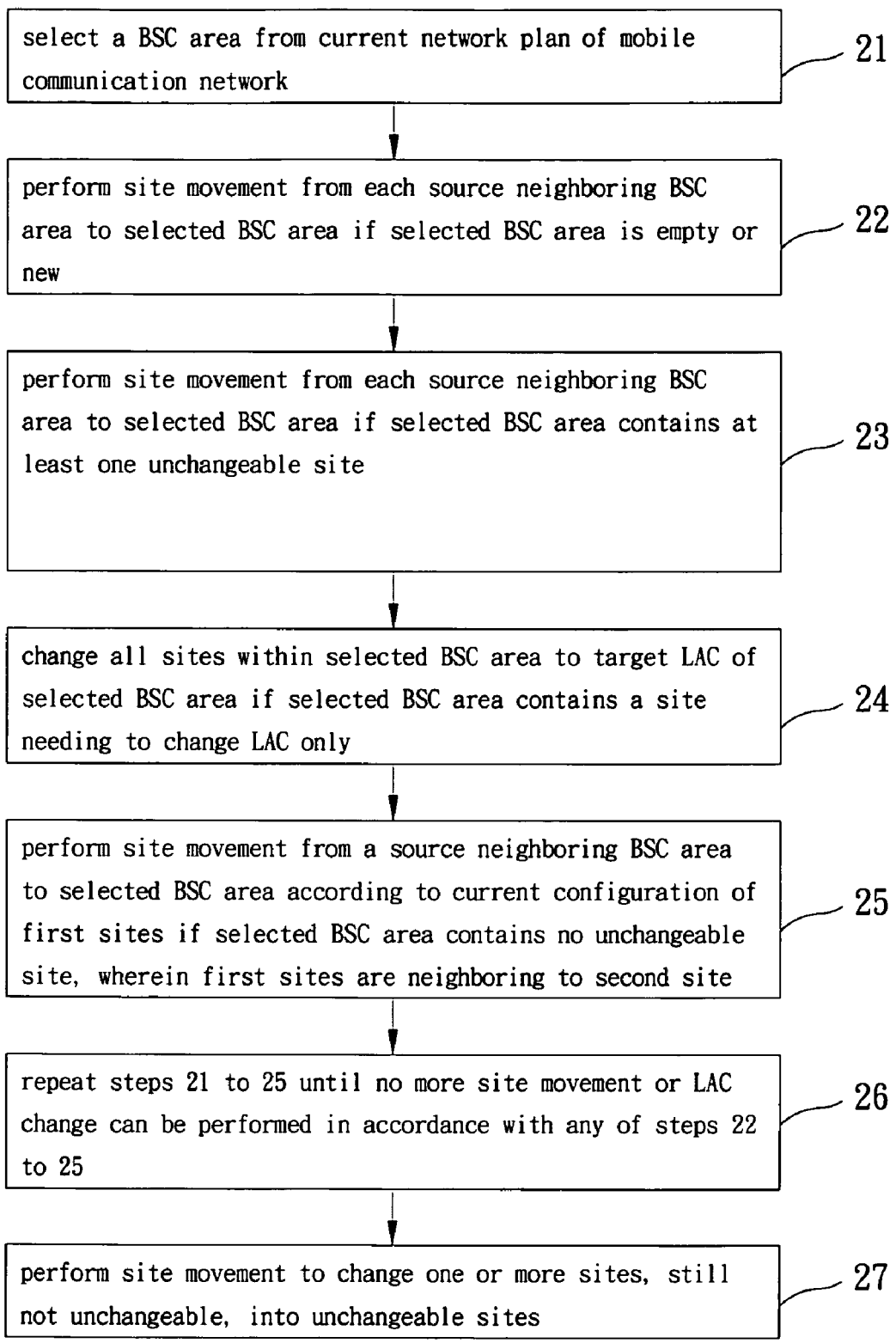
FIG. 2 is a flow chart of a preferred embodiment of the method for deployment scheduling for a mobile communication network according to the present invention.

FIG. 2 is a flow chart of a preferred embodiment of the method for deployment scheduling for a mobile communication network according to the present invention. The mobile communication network is to be changed from a first network plan (or original network plan) to a second network plan (or target network plan). Both the first and second network plans comprises a plurality of BSC areas and location areas.

Before detailing the embodiment, the definition for several terms is made as follows. A site movement means to change the configuration of one or more sites at a time. The configuration of a site indicates which area the site belongs to on each partition layer (i.e. BSC area and location area for the embodiment of FIG. 2). Unless specified otherwise, the site movement means to change the site from a current configuration to a target configuration as in the target network plan. An unchangeable site means both the current and target configuration of the site is the same. A neighbor site of a specific site, i.e. a site neighboring to the specific site, means the site capable of performing handover operation to the specific site. A neighbor family of a specific site include the sites each satisfying two conditions: (a) capable of performing handover operation, with or without any intermediary site, to the specific site; and (b) staying in the same current BSC area and targeted to the same BSC area as the specific site. A source neighboring BSC area of a specific BSC area includes one or more sites targeted to the specific BSC area.

As shown in FIG. 2, the flow comprises steps of:

21 selecting a BSC area from the current network plan of the mobile communication network;

22 performing a site movement from each source neighboring BSC area of the selected BSC area to the selected BSC area if the selected BSC area is empty or new;

23 performing a site movement from each source neighboring BSC area of the selected BSC area to the selected BSC area if the selected BSC area contains at least one unchangeable site;

24 changing all sites within the selected BSC area to a target location area code (LAC) of the selected BSC area if the selected BSC area contains at least one site which needs to change LAC only;

25 performing a site movement from a source neighboring BSC area of the selected BSC area to the selected BSC area according to current configuration of first sites within the selected BSC area if the selected BSC area does not contain any unchangeable site, wherein the first sites are neighboring to a second site of the source neighboring BSC area targeted to the selected BSC area;

26 repeating steps 21 to 25 until no more site movement or LAC change can be performed in accordance with any of steps 22 to 25; and 27 performing a site movement to change one or more sites, which are still not unchangeable sites, into unchangeable sites.

In the embodiment of FIG. 2, if any site movement is predicted to cause the network overloaded, it will not be performed, thereby securing the network quality during the deployment. The network overloading occurs when one or more network parameters exceed their limits. Thus, these limits can serve as network loading constraints for the site movement. During the flow of FIG. 2, network parameters associated with each level of BSC, LA and MSC are monitored. The BSC level parameters include BSC E1 Link, TRX, Erlang, BSC CPU loading, paging, BHCA (busy hour call attempts), etc. of each BSC. The LA level parameters include total paging of each LA. The MSC level parameters include MSC E1 Link, Erlang, MSC CPU loading, paging, BHCA, etc. of each MSC. The network parameters mentioned above are well known to the skilled in the art, and would not be described in detail here. Based on the monitored parameters, it can be accurately predicted whether a site movement will cause the network overloaded or not. In one embodiment, in each site movement, a site is moved along with its neighbor family, thereby performing the network deployment more efficiently.

In addition to the network loading constraints, a site movement should meet a work loading constraint for the deployment. In one embodiment, the work loading constraint defines how many site movements and LAC changes can be performed in a period of time according to the labor power provided for the deployment. The work loading constraint also serves to keep the network from drastic change.

In both steps 22 and 23, the site movement from each source neighboring BSC area to the selected BSC area is performed such that each moved-in site becomes an unchangeable site neighboring to another unchangeable site of the selected BSC area. In this manner, the selected BSC area can maintain both BSC connectivity and LA connectivity. FIG. 3A to 3C show an example for this. By comparing both the current and target network plans, it can be determined whether a site within the current network plan is an unchangeable site, a site needing to change LAC only, or else. In FIG. 3A, in the current network plan, the selected BSC area is BSC4 having an unchangeable site (e.g. site c). Thus, step 22 is performed to move site a and its neighbor family from BSC3 (source neighboring BSC area) to BSC4, as shown in FIG. 3B. It is notable that both BSC connectivity and LA connectivity for BSC4 is maintained after the site movement. In one embodiment, if the selected BSC area has several source neighboring BSC areas for performing the site movement, then the source neighboring BSC areas are processed in an order determined according to their respective loading. For example, the source neighboring BSC area with a higher loading is processed prior to that with a lower loading.

Figure 4C:
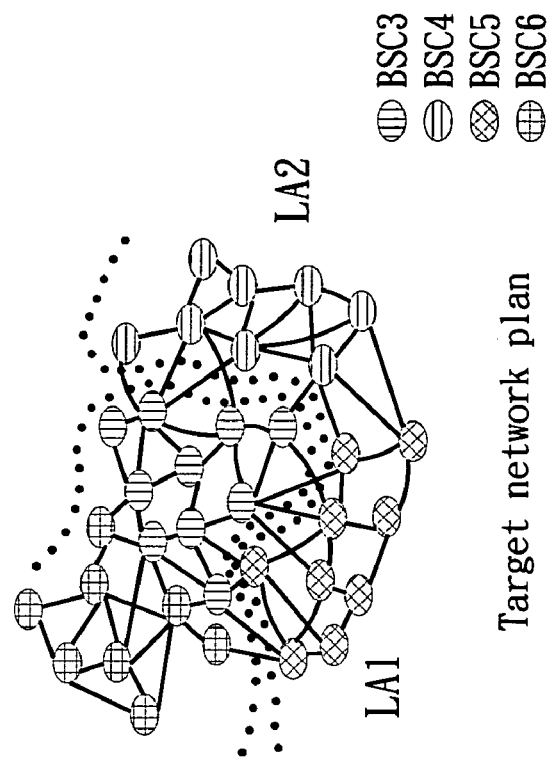
Figure 4B:
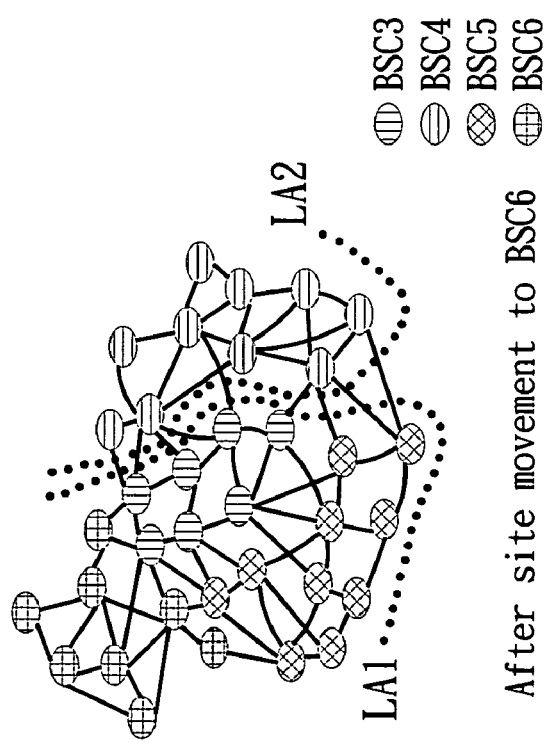

In step 22, if a first neighboring BSC area of the selected BSC area contains an unchangeable site which is neighboring to the selected BSC area and has a same LAC as a target LAC of the selected BSC area, then the site(s) neighboring to the unchangeable site and targeted to the selected BSC area is moved first. In this manner, the selected BSC area is connected to an existing LA through the unchangeable site, thereby securing the LA connectivity for the selected BSC area. FIG. 4A to 4C are diagrams showing an example of performing step 22 for an empty BSC area having the first neighboring BSC area. In FIG. 4A, the current network plan contains a new BSC area, and the neighboring BSC area (i.e. BSC3) contains an unchangeable site, the neighbor site of which would be moved first. FIG. 4B shows the result after all sites are moved into the new BSC area (i.e. BSC6). On the other hand, an example of performing step 22 for an empty BSC area without the first neighboring BSC area is shown in FIG. 5A to 5C (i.e. the empty BSC area is BSC4), and an example of performing step 22 for an empty BSC area with a new LAC as the target LAC is shown in FIG. 6A to 6C (i.e. the empty BSC area is BSC4 and the new LAC is LAC3).

In step 23, if the selected BSC area and another BSC area containing at least one unchangeable site are both a source neighboring BSC area to each other, then a two-way site movement between the selected BSC area and the another BSC area (i.e. these two BSC areas exchange their sites) is performed to increase the efficiency of the deployment.

Figure 7A:
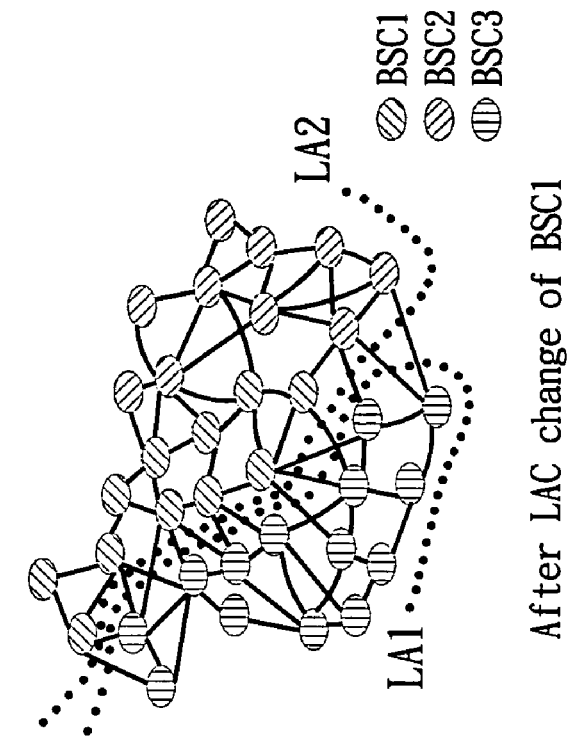
FIG. 7A to 7C are diagrams showing an example of performing step 24.
Figure 7B:
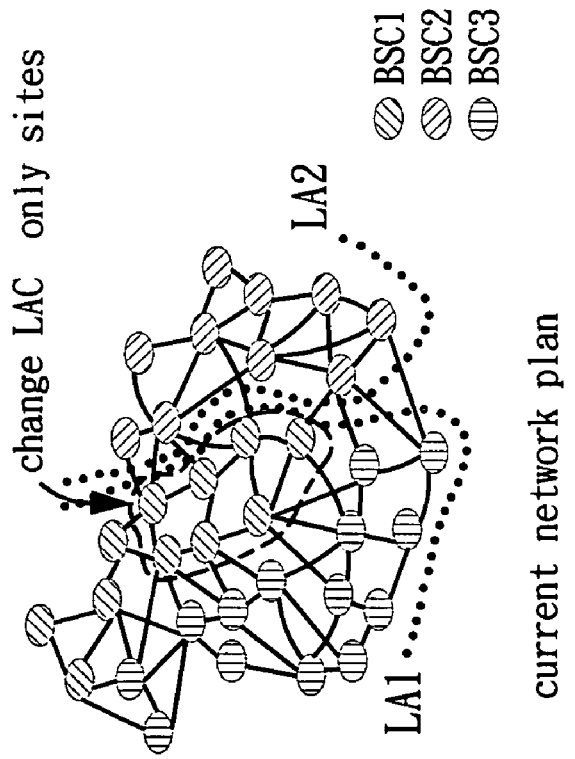
Figure 7C:
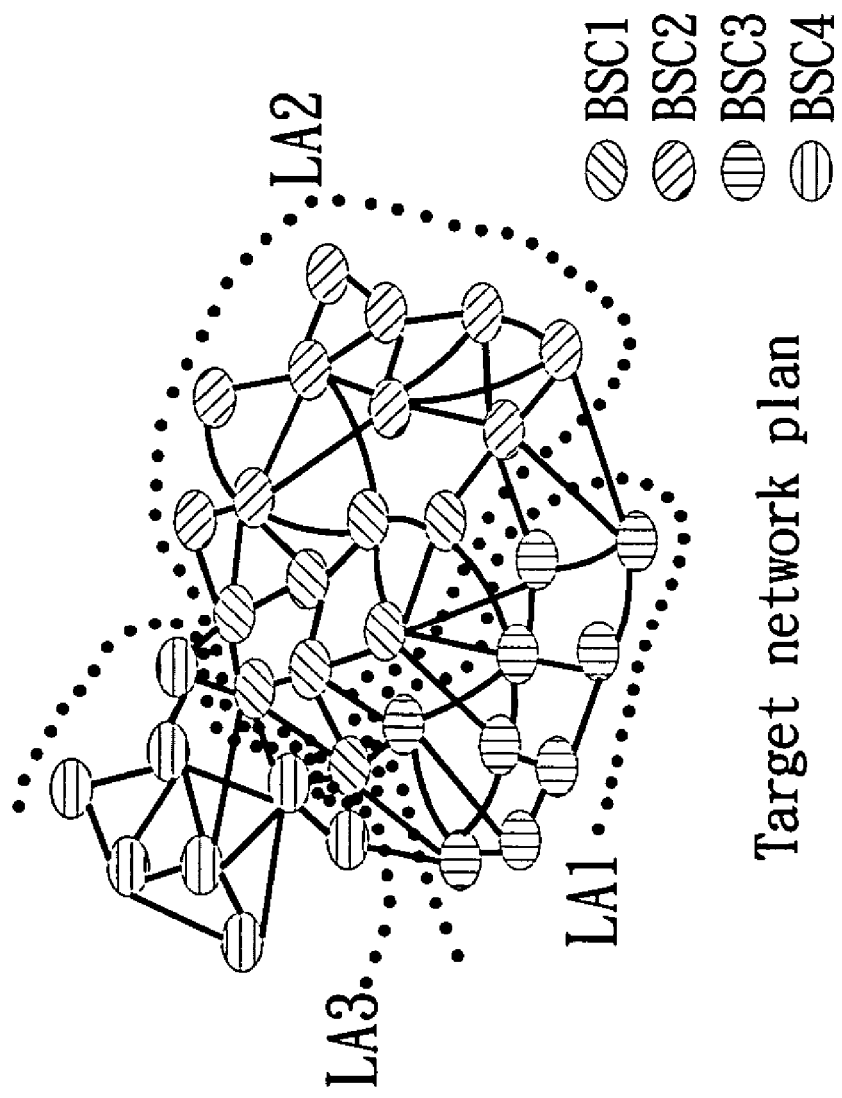

In step 24, the objective of the LAC change is to create one or more unchangeable sites for the selected BSC area. The number of created unchangeable sites depends on the number of the sites needing to change LAC only within the selected BSC area. FIG. 7A to 7C are diagrams showing an example of performing step 24. In FIG. 7A, the current network plan includes BSC1 which contains seven change-LAC-only sites (target LAC is LAC2, as shown in FIG. 7C). FIG. 7B shows the result after performing the LAC change for BSC1.

In step 25, there are two cases to be considered:

Case 1: If one of the first sites has a LAC the same as a target LAC of the second site, then the second site and its neighbor family are moved into the selected BSC area and set to the target LAC of the second site. In this manner, the second site and its neighbor family are turned into unchangeable sites within the selected BSC area, and both BSC connectivity and LA connectivity can be maintained since the second site is neighboring to the first sites. FIG. 8A to 8C are diagrams showing an example of performing step 25 for case 1. The selected BSC area is BSC1. As shown in FIG. 8A, in the current network plan, site d (first site) is neighboring to site b (second site) and has a LAC (i.e. LAC3) the same as the target LAC of site b (cf. FIG. 8C), which is the same as the current LAC of site b. Thus, site b and its neighbor family are moved into BSC1 without LAC change, as shown in FIG. 8B.

Case 2: If none of the first sites has a LAC the same as the target LAC of the second site, then the second site and its neighbor family are moved into the selected BSC area and set to a LAC selected from current LACs of the first sites according to respective paging loads for the current LACs. In this case, the second site and its neighbor family need another LAC change to reach their target LAC. The selected LAC, for example, may be the one with lowest paging load, thereby reducing the possibility of a potential paging overload caused by the LAC change of the second site and its neighbor family. It is notable that if the current LACs of the first sites are the same, the LACs of the second site and its neighbor family are set to the same LAC. FIG. 9A to 9C are diagrams showing an example of performing step 25 for case 2. The selected BSC area is BSC1. By comparing FIG. 9A and 9C, it is obvious that none of the neighbor sites (first sites) of site b (second site) has a LAC the same as the target LAC (i.e. LAC3) of site b. The current LACs of the first sites are LAC1 and LAC4, and the paging load for LAC4 is assumed higher than that for LAC1. Accordingly, site b and its neighbor family are moved into BSC1 and set to LAC4, as shown in FIG. 9B.

In step 26, steps 21 to 25 are repeated to make each BSC area contain more unchangeable sites, thereby progressively changing the mobile network toward the target network plan. The sites, which are still not unchangeable after step 26, include those without any neighbor site. Thus, in step 27, a site movement for these sites is performed to change them into unchangeable sites. FIG. 10A and 10B are diagrams showing an example of performing step 27. FIG. 10A shows a current network plan containing a site with no neighbor site, while FIG. 10B shows the result after performing the site movement for the no-neighbor site.

In step 21, the selection is made according to a priority level of each BSC area within the current network plan. A BSC area with a higher priority level is selected prior to that with a lower one. The priority level of the BSC area may be varied since the BSC configuration changes continuously during the network deployment. In one embodiment, the priority level of an empty (or new) BSC area with the first neighboring BSC area (see FIG. 4) is highest. In addition, the priority level of an empty BSC area with a new LAC as the target LAC (cf. FIG. 6A) is higher than that of an empty BSC area with no first neighboring BSC area (cf. FIG. 5A). On the other hand, the priority level of a BSC area, which contains no unchangeable site and contains a site needing to change LAC only, is lower than that of a BSC area containing at least one unchangeable site, while higher than that of a non-empty BSC area containing no unchangeable site. In this embodiment, a BSC area with a lower priority level may turn into that with a higher one during the deployment, and the site movement for the latter has better effects (e.g. better area connectivity) than the former.

In another embodiment, the sequence of priority level from high to low is as follows: an empty BSC area with the first neighboring BSC area, a BSC area containing at least one unchangeable site, an empty BSC area with a new LAC as the target LAC, a BSC area containing no unchangeable site and containing a site needing to change LAC only, a non-empty BSC area containing no unchangeable site, and an empty BSC area with no first neighboring BSC area.

In the embodiment of FIG. 2, the target network plan is generated according to a partitioning algorithm. The partitioning algorithm provides a refined or optimized network plan so as to reduce the load of the mobile network and upgrade the network performance accordingly. In one embodiment, if a site movement for a plurality of sites does not meet some specific constraint(s) such as network loading constraint or work loading constraint mentioned above, then a partitioning algorithm can be used to divide the plurality of sites into two parts with the load reduced as much as possible, where the site movement for one of the two parts, which contains site(s) neighboring to the targeted BSC area, satisfies the specific constraint(s). Thus, the part containing those neighboring site(s) should then be moved first. The applicable partitioning algorithms include, but are not limited to, K-L (Kernighan-Lin) algorithm and F-M (Fiduccia-Mattheyses) algorithm. For information on K-L algorithm, please refer to "An Efficient Heuristic Procedure for Partitioning Graphs" (The Bell system technical journal, 49(1):291-307, 1970).

For information on F-M algorithm, please refer to "A Linear-Time Heuristic for Improving Network Partitions" (Proc. of DAC, 1982). The above-mentioned publications are incorporated herein by reference.

It is notable that all the above embodiments can be applied to any mobile network with a partitioning structure equivalent to that of a GSM network, such as CDMA 2000, GPRS (i.e. General Packet Radio Service), etc. In CDMA 2000, centralized base station controller (CBSC) is equivalent to BSC, and zone is equivalent to location area. In GPRS, packet control unit (PCU), registration area and serving GPRS support node (SGSN) are equivalent to BSC, location area and MSC, respectively.

While the present invention has been shown and described with reference to the preferred embodiments thereof and in terms of the illustrative drawings, it should not be considered as limited thereby. Various possible modifications and alterations could be conceived of by one skilled in the art to the form and the content of any particular embodiment, without departing from the scope and the spirit of the present invention.

What is claimed is:

1. A method for progressively changing a mobile communication network from an original network plan to a target network plan, wherein both the original and target network plans comprise at least one location area, each non-empty location area comprises at least one base station controller (BSC) area, and each non-empty BSC area comprises at least one site, wherein each site has a corresponding location area code (LAC) to indicate which location area the site belongs to, the method comprising steps of:
   (a) selecting a BSC area from a current network plan of the mobile communication network, wherein the selected BSC area has at least one source neighboring BSC area which includes at least one site which belongs to the selected BSC area in the target network plan;
   (b) performing a first site movement from each source neighboring BSC area of the selected BSC area to the selected BSC area if the selected BSC area is empty, wherein the first site movement comprises changing the LAC of each moved-in site to a target LAC of the selected BSC area which indicates which location area the selected BSC area belongs to in the target network plan;
   (c) performing a second site movement from each source neighboring BSC area of the selected BSC area to the selected BSC area if the selected BSC area contains at least one unchangeable site which belongs to the same BSC area and the same location area in both the current network plan and the target network plan, wherein each moved-in site of the second site movement is neighboring to one of the at least one unchangeable site or neighboring to another previously moved-in site, and the LAC of each moved-in site is set to the LAC of the at least one unchangeable site; and
   (d) performing a third site movement to move a second site from one of the at least one source neighboring BSC area of the selected BSC area to the selected BSC area if the selected BSC area is non-empty and contains no unchangeable site, wherein the third site movement comprises setting the LAC of the second site according to current LACs of first sites which are neighboring to the second site and lie within the selected BSC area.

2. The method of claim 1, wherein any of the first, second and third site movements is not performed if the any of the first, second and third site movements is predicted to cause the mobile communication network overloaded.

3. The method of claim 1, wherein any of the first, second and third site movements is not performed if the any of the first, second and third site movements does not meet a work loading constraint for changing the mobile communication network.

4. The method of claim 1, wherein each of the first, second and third site movements comprises moving a specific site and a neighbor family of the specific site from one of the at least one source neighboring BSC area of the selected BSC area to the selected BSC area, wherein the neighbor family of the specific site includes at least one site which is: (1) capable of performing handover operation, with or without any intermediary site, to the specific site: (2) staying in the same BSC area as the specific site currently: and (3) belonging to the selected BSC area in the target network plan as the specific site.

5. The method of claim 1, wherein the steps (a) to (d) are repeated until no more first, second or third site movement can be performed.

6. The method of claim 1, wherein the step (a) is executed according to a priority level of each BSC area within the current network plan.

7. The method of claim 6, wherein the priority level of an empty BSC area with a first neighboring BSC area is highest, wherein the first neighboring BSC area contains an unchangeable site which is neighboring to the empty BSC area and has the same LAC as a target LAC of the empty BSC area.

8. The method of claim 7, wherein the priority level of the empty BSC area with a newly-added LAC as the target LAC of the empty BSC area is higher than that of the empty BSC area with no first neighboring BSC area.

9. The method of claim 6, wherein the priority level of a BSC area containing at least one unchangeable site is higher than that of a non-empty BSC area containing no unchangeable site.

10. The method of claim 1, prior to the step (d) further comprising:
   (d0) setting all sites within the selected BSC area to the target LAC of the selected BSC area if the selected BSC area contains no unchangeable site and contains at least one site which belongs to the selected BSC area in the target network plan and has a LAC different from the target LAC of the selected BSC area.

11. The method of claim 1, wherein if the LAC of one of the first sites is the same as a target LAC of the second site, the third site movement comprises setting the second site to the target LAC of the second site, wherein the target LAC of the second site is the LAC of the second site in the target network plan.

12. The method of claim 11, wherein if the LAC of none of the first sites is the same as the target LAC of the second site, the third site movement comprises setting the second site to a LAC which is selected from the current LACs of the first sites according to respective paging loads of the current LACs.

13. The method of claim 1, further comprising:
   (e) performing a fourth site movement to change a third site, which is not an unchangeable site and does not have any neighbor site, into an unchangeable site.

14. The method of claim 1, wherein the second network plan is generated according to a partitioning algorithm for the mobile communication network.

* * * * *